(12) United States Patent
Maiti et al.

(10) Patent No.: US 9,201,692 B2
(45) Date of Patent: Dec. 1, 2015

(54) SYSTEM AND METHOD FOR GENERATING A PLAN TO COMPLETE A TASK IN COMPUTING ENVIRONMENT

(71) Applicant: Tata Consultancy Services Limited, Maharashtra (IN)

(72) Inventors: Santa Maiti, West Bengal (IN); Debnath Mukherjee, West Bengal (IN); Plaban Kumar Bhowmick, West Bengal (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 0 days.

(21) Appl. No.: 14/478,447

(22) Filed: Sep. 5, 2014

(65) Prior Publication Data

US 2015/0067690 A1    Mar. 5, 2015

(30) Foreign Application Priority Data

Sep. 5, 2013  (IN) .......................... 2879/MUM/2013

(51) Int. Cl.
| | |
|---|---|
| G06F 9/46 | (2006.01) |
| G06F 9/48 | (2006.01) |
| G06N 5/02 | (2006.01) |
| G06F 9/44 | (2006.01) |
| G06F 17/00 | (2006.01) |
| G06N 5/00 | (2006.01) |
| G06Q 10/06 | (2012.01) |

(52) U.S. Cl.
CPC ............... *G06F 9/4881* (2013.01); *G06F 8/30* (2013.01); *G06F 17/60* (2013.01); *G06N 5/00* (2013.01); *G06N 5/02* (2013.01); *G06Q 10/06* (2013.01)

(58) Field of Classification Search
USPC .............................................. 718/1, 100–107
IPC ..................................... G06F 8/30,8/31, 9/4881
See application file for complete search history.

(56) References Cited

U.S. PATENT DOCUMENTS

| | | |
|---|---|---|
| 4,700,317 A | 10/1987 | Watanabe et al. |
| 8,161,187 B2 | 4/2012 | Anderson et al. |
| 8,649,042 B2 | 2/2014 | Ocke et al. |

(Continued)

OTHER PUBLICATIONS

Denecker et al, "Towards a Logical Reconstruction of a Theory for Locally Closed Databases" ACM Transactions on Database Systems, vol. 35, No. 3, Article 22, pp. 1-60, 2010.*

(Continued)

*Primary Examiner* — Anil Khatri
(74) *Attorney, Agent, or Firm* — Thompson Hine LLP

(57) ABSTRACT

A system and method for generating a plan to complete a task by providing a framework facilitating use of heterogeneous data sources without altering a planning algorithm are disclosed. The method includes using a first dataset of logical atoms represented in predicate schema and second dataset of database atoms represented in non-predicate schema, and modifying a grammar rule, a domain definition, and a problem definition, and selecting and executing task methods and task operators to complete a task. Execution of task operator includes verifying a precondition, assigning variables with values when the precondition is valid, and modifying (delete and add) a plan state. Execution of the task method includes verifying a precondition of the task method, assigning variables with values when the precondition is valid, decomposing the task into sub-tasks, assigning arguments of task method to sub-tasks, and adding sub-tasks to a task list. Thereafter, a plan is generated.

15 Claims, 5 Drawing Sheets

(56) References Cited

U.S. PATENT DOCUMENTS

| | | |
|---|---|---|
| 8,745,637 B2 | 6/2014 | Singh et al. |
| 2010/0128304 A1 | 5/2010 | Ocke et al. |
| 2013/0124561 A1 | 5/2013 | Pradhan et al. |

OTHER PUBLICATIONS

Gottlob et al, "Normalization and optimization of schema mappings" The VLBD Journal, 20:, pp. 277-302, 2011.*

Caroprese et al, "A Logic Based Approach for Managing Incompleteness and Inconsistencies in P2P Deductive Databases" ACM, pp. 1-6, 2015.*

Adindla et al, "Using Predicate-Argument Structure to Bootstrap a Domain Model for Site Search: Results of a Task-Based Evaluation", ACM, pp. 29-32, 2013.*

Jin et al, "A Systematic Approach for Optimizing Complex Mining Tasks on Multiple Databases", IEEE, pp. 1-10, 2006.*

Lin et al, "The predicate formulae for object-oriented database schema evolution", IEEE, pp. 346-349, 2010.*

Doina Caragea, Adrian Silvescu and Vasant Honavar "A Framework for Learning from Distributed Data Using Sufficient Statistics and Its Application to Learning Decision Trees", International Journal of Hybrid Intelligent Systems; vol. 1, Nos. 1-2/2004, 80-89.

* cited by examiner

SYSTEM AND METHOD FOR GENERATING A PLAN TO COMPLETE A TASK IN COMPUTING ENVIRONMENT

CROSS-REFERENCE TO RELATED APPLICATIONS AND PRIORITY

The present application claims priority to Indian Patent Application No. 2879/MUM/2013, filed on Sep. 5, 2013, the entirety of which is hereby incorporated by reference.

TECHNICAL FIELD

The present subject matter described herein, in general, relates to intelligent systems for planning, and more particularly to planning systems for generating a plan in a computing environment.

BACKGROUND

In the field of artificial intelligence, planning is a process of selecting and organizing actions by considering expected outcomes or goals. In a planning process, the plan state denotes a state of the world and is represented as a set of state facts. During the planning process, the plan state undergoes changes as determined by post conditions of actions included in a plan. The planning system has to select and execute a set of actions in order to reach a goal state.

Current planning techniques, or particularly plan state representation techniques, suffer from many limitations such as practicability, scalability, and modularity. In a real world scenario, the planning system needs to access a collection of information available from heterogeneous data sources. The heterogeneous data sources include databases, ontology, application program interface calls, and web services, and the like. However, the current planning techniques do not consider heterogeneity of information in the plan state. Hence, the practicability limitation in the planning systems is not solved. In practical cases, the plan state may be enormously large, which in turn may affect performance of the planning system. As an example, the HTN (Hierarchical Task Network) planner, JSHOP2 (a Java implementation of Simple Hierarchical Ordered Planner), suffers from scalability problem because the plan state has a large number of state facts represented in a monolithic predicate-based schema. Further, during planning, a complete set of information is loaded into the memory of the planning system, whereas only a part of the complete set of information is actually required at various points of execution in the generation of the plan. Hence the loading of a large amount of information into the memory of the planning system leads to a scalability problem.

In general, data sources follow a modularity approach. For example, data comprising weather information, road information, and transport information may be maintained in database systems. Further, separate tables may be used to store the data. Therefore, a change in one module or a table does not affect the change in other modules or tables of the database systems. The current plan state representation does not follow the modularity approach as the information in the plan state is presented using the monolithic predicate-based schema.

Further, conventional planning techniques do not provide optimized use of data during generation of the plan. The conventional planning techniques use the monolithic predicate-based schema for the plan state representation wherein a world state is described as a set of predicates that are currently true. On the contrary, in reality the world state has to be obtained by aggregating information from different modular sources represented through multiple knowledge representation techniques. Further, performance of the planning system may be affected when the size of the plan state is enormously large. Thus, the conventional planning techniques face many challenges in providing an efficient and optimized plan state representation during plan generation.

SUMMARY

This summary is provided to introduce aspects related to systems and methods. A system for generating a plan to complete a task in a computing environment and the aspects thereof are further described below in the detailed description. This summary is not intended to identify essential features of the claimed subject matter nor is it intended for use in determining or limiting the scope of the claimed subject matter.

In one implementation, a method for optimal representation of a plan state while generating a plan to complete a task in a computing environment, where the optimal representation of the plan state improves efficiency of the computing environment through improved utilization of memory and reduction of overhead from data retrieval is described. The method includes providing a processor and a non-transitory memory coupled to the processor, where the non-transitory memory includes programmed instructions. A plan state is represented, the plan state including one or more tasks and including a first dataset and a second dataset, where the second dataset is received from one or more heterogeneous data sources. The first dataset includes logical atoms represented in a predicate-based schema, and the second dataset includes database atoms represented in a non-predicate-based schema. The logical atoms indicate dynamically-varying data to be accessed frequently, and the database atoms indicate static data. A database atom of the second dataset is represented with a path that facilitates selective access of the database atoms from the one or more heterogeneous data sources. The processor iteratively selects one or more task methods from a set of predefined task methods and one or more task operators from a set of predefined task operators, based on the one or more tasks to be completed, to define one or more selected task methods and one or more selected task operators. The processor successively executes the selected task methods and the selected task operators in order to complete the task. The execution of each of the selected task methods and each of the selected task operators includes validating a first precondition associated with the selected task method and a second precondition associated with the selected task operator, by matching a first set of variables associated with the selected task method and a second set of variables associated with the selected task operator, with at least one of the logical atoms and the database atoms, and wherein matching of the database atoms is facilitated using the path. The execution further includes assigning, if the first precondition is valid, the first set of variables with a first set of values, and assigning, if the second precondition is valid, the second set of variables with a second set of values, where the first set of values and the second set of values are obtained from one or more logical atoms of the first dataset and one or more database atoms of the second dataset, so matched with the first set of variables and the second set of variables, respectively. The method further includes executing the selected task method using the first set of values and the selected task operator using the second set of values, and generating, via the processor, a plan based upon the execution of the selected task methods and the selected task operators.

The representation of the database atoms in the non-predicate-based schema and the selective access of the database atoms from the one or more heterogeneous data sources using the path makes the plan state scalable, practical and modular. Cache memory is used to store the database atoms so fetched. The logical atoms indicating dynamically varying data continually resides in the memory during the generation of the plan, whereas the database atoms indicating the static data is selectively loaded in the memory only when required during the generation of the plan, thereby facilitating optimal utilization of the memory and reducing data retrieval overhead during the generation of the plan. The one or more heterogeneous data sources comprise databases, ontologies, application program interface calls, and web services.

In one implementation, a system is described for optimal representation of a plan state while generating a plan to complete a task in a computing environment, where the optimal representation of the plan state improves efficiency of the computing environment through improved utilization of memory and reduction of overhead from data retrieval. The system comprises a processor and a memory coupled to the processor. The processor is capable of executing programmed instructions stored in the memory. The programmed instructions are executed for representing a plan state including one or more tasks and including a first dataset and a second dataset, where the second dataset is received from one or more heterogeneous data sources. The first dataset includes logical atoms represented in a predicate-based schema, and the second dataset includes database atoms represented in a non-predicate-based schema. The logical atoms indicate dynamically-varying data to be accessed frequently, and the database atoms indicate static data. A database atom of the second dataset is represented with a path that facilitates selective access of the database atoms from the one or more heterogeneous data sources. The programmed instructions are further executed to iteratively select one or more task methods from a set of predefined task methods and one or more task operators from a set of predefined task operators, based on the one or more tasks to be completed, to define one or more selected task methods and one or more selected task operators. The programmed instructions are executed to successively execute the selected task methods and the selected task operators in order to complete the task. The execution of each of the selected task methods and each of the selected task operators includes validating a first precondition associated with the selected task method and a second precondition associated with the selected task operator, by matching a first set of variables associated with the selected task method and a second set of variables associated with the selected task operator, with at least one of the logical atoms and the database atoms, and wherein matching of the database atoms is facilitated using the path. The execution further includes assigning, if the first precondition is valid, the first set of variables with a first set of values, and assigning, if the second precondition is valid, the second set of variables with a second set of values, where the first set of values and the second set of values are obtained from one or more logical atoms of the first dataset and one or more database atoms of the second dataset, so matched with the first set of variables and the second set of variables, respectively. The system further includes programmed instructions for executing the selected task method using the first set of values and the selected task operator using the second set of values, and generating a plan based upon the execution of the selected task methods and the selected task operators.

In one implementation, a non-transitory computer readable medium embodying a program executable in a computing device for optimal representation of a plan state while generating a plan to complete a task in a computing environment, wherein the optimal representation of the plan state improves efficiency of the computing environment through improved utilization of memory and reduction of overhead from data retrieval is described. The program comprises a program code for representing a plan state including one or more tasks and including a first dataset and a second dataset, where the second dataset is received from one or more heterogeneous data sources. The first dataset includes logical atoms represented in a predicate-based schema, and the second dataset includes database atoms represented in a non-predicate-based schema. The logical atoms indicate dynamically-varying data to be accessed frequently, and the database atoms indicate static data. A database atom of the second dataset is represented with a path that facilitates selective access of the database atoms from the one or more heterogeneous data sources. The program further comprises a program code for iteratively selecting one or more task methods from a set of predefined task methods and one or more task operators from a set of predefined task operators, based on the one or more tasks to be completed, to define one or more selected task methods and one or more selected task operators. The program further comprises a program code for successively executing the selected task methods and the selected task operators in order to complete the task. The execution of each of the selected task methods and each of the selected task operators includes validating a first precondition associated with the selected task method and a second precondition associated with the selected task operator, by matching a first set of variables associated with the selected task method and a second set of variables associated with the selected task operator, with at least one of the logical atoms and the database atoms, and wherein matching of the database atoms is facilitated using the path. The execution further includes assigning, if the first precondition is valid, the first set of variables with a first set of values, and assigning, if the second precondition is valid, the second set of variables with a second set of values, where the first set of values and the second set of values are obtained from one or more logical atoms of the first dataset and one or more database atoms of the second dataset, so matched with the first set of variables and the second set of variables, respectively. The program further comprises a program code for executing the selected task method using the first set of values and the selected task operator using the second set of values, and generating a plan based upon the execution of the selected task methods and the selected task operators.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Figure 1:
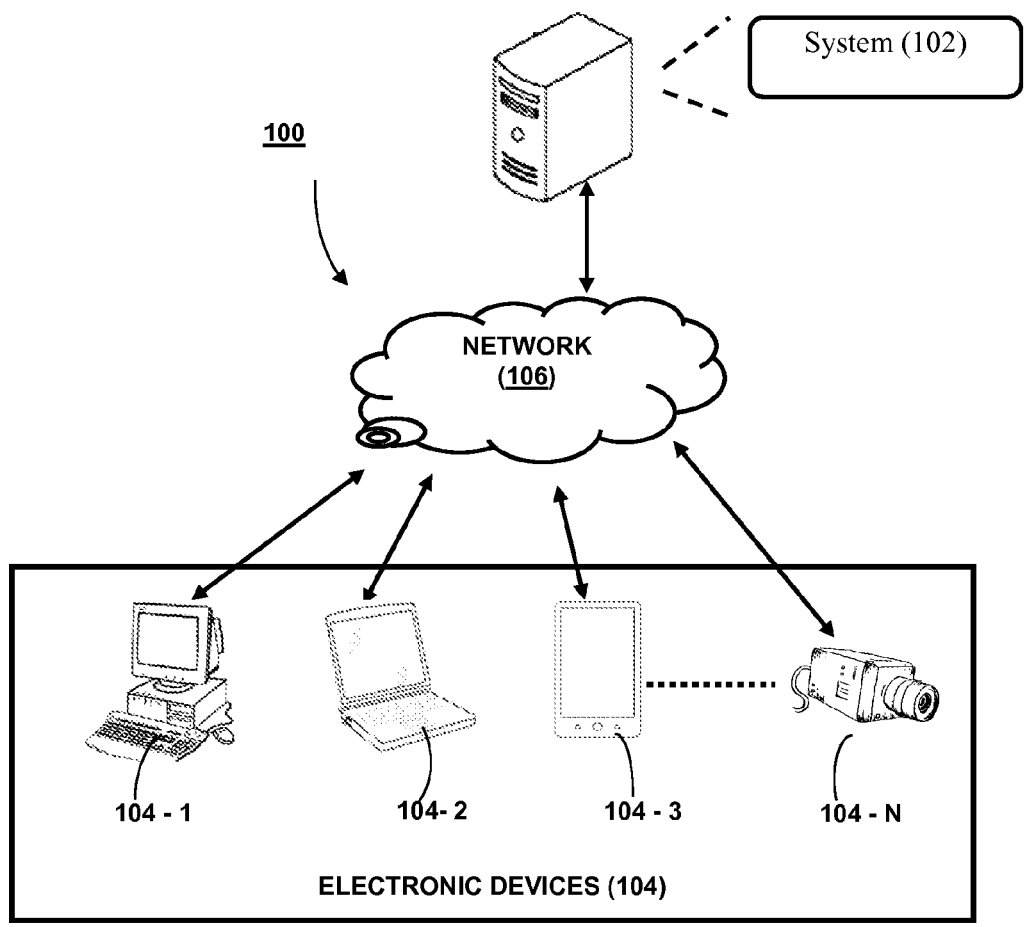
FIG. 1 illustrates a network implementation of a system for generating a plan to complete a task in a computing environment, in accordance with an embodiment of the present subject matter.

System(s) and method(s) for generating a plan to complete a task in a computing environment are described. The system provides a framework that facilitates use of heterogeneous data sources to represent a plan state in order to generate the plan. The system and method facilitates representation of the plan state. The plan state representation comprises a combination of information in predicate form as well as references to information in non-predicate form stored in a variety of data sources like databases, ontologies, etc. The plan state representation using information from distributed heterogeneous data sources, without altering planning algorithm in concern is disclosed. Hence, according to the present disclosure, the system provides a framework capable of handling the non-predicate-based data along with the predicate-based data, and a provision to access the non-predicate-based data from the plan state on a demand basis. A key aspect of the present disclosure is to handle overheads caused by the non-predicate-based data without changing the main planning process.

The system and method for generating the plan may comprise receiving one or more logical atoms, and one or more database atoms. The one or more logical atoms may be represented in a first schema, and the one or more database atoms may be represented in a second schema. The first schema may be a predicate-based schema. The logical atoms may be represented using predicate logic. The second schema may be a non-predicate-based schema, and representation of the database atom comprises a path to selectively access the database atom stored in one or more data sources. The system and method may further receive a task list in the form of a task network, a set of task methods, and a set of task operators required to complete the task. The task list defines a task.

Further, the system and method select and execute a task method and/or a task operator iteratively from the set of task methods and the set of task operators to complete the task. The execution of the task method and the task operator may comprise iteratively verifying a precondition associated with the task method and the task operator for validity. The precondition may be a logical expression of variables mentioned in a task method representation and a task operator representation. The precondition may be verified by comparing variables of the task method or the task operator with the logical atoms or the database atoms in order to match the variables with the logical atoms or the database atoms.

When the precondition is valid, the variables are assigned with the values obtained from the logical atoms and/or the database atoms so matched with the variables. When the task method is selected, the task method is decomposed into sub-tasks, and the values of the arguments/variables of the task method are assigned to the arguments of the sub-tasks, and the sub-tasks are added to the task list in order to execute the sub-tasks. The sub-tasks may be executed by iteratively performing the selection and the execution of each sub-task. Further, the system may generate the plan based upon the execution of all the tasks and sub-tasks form the task list.

While aspects of described system and method for generating a plan to complete a task in a computing environment may be implemented in any of a number of different computing systems, environments, and/or configurations, the embodiments are described in the context of the following exemplary system.

Referring now to FIG. 1, a network implementation 100 of a system 102 for generating a plan to complete a task in a computing environment is illustrated, in accordance with an embodiment of the present subject matter. In one embodiment, the system 102 may select a task method from the set of task methods and/or a task operator from the set of task operators and may execute the task method and/or the task operator. In one embodiment, the system 102 may verify whether a precondition associated with the task method and/or the task operator is valid. After verifying the precondition, one or more variables of the precondition may be assigned with one or more values when the precondition is valid. In another embodiment, when the task method is selected, the system may decompose the task method into one or more sub-tasks and may iteratively execute the one or more sub-tasks in order to complete the task. In another embodiment, the system may generate the plan based on the execution of the task and each of the sub-tasks from the task list.

Although the present subject matter is explained considering that the system 102 is implemented on a server, it may be understood that the system 102 may also be implemented in any of a variety of computing systems, such as a laptop computer, a desktop computer, a notebook, a workstation, a mainframe computer, a server, a network server, and the like. In one implementation, the system 102 may be implemented in a cloud-based environment. It will be understood that the system 102 may be accessed by multiple users through one or more user devices 104-1, 104-2, 104-3 . . . 104-N, collectively referred to as user devices 104 hereinafter, or by applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
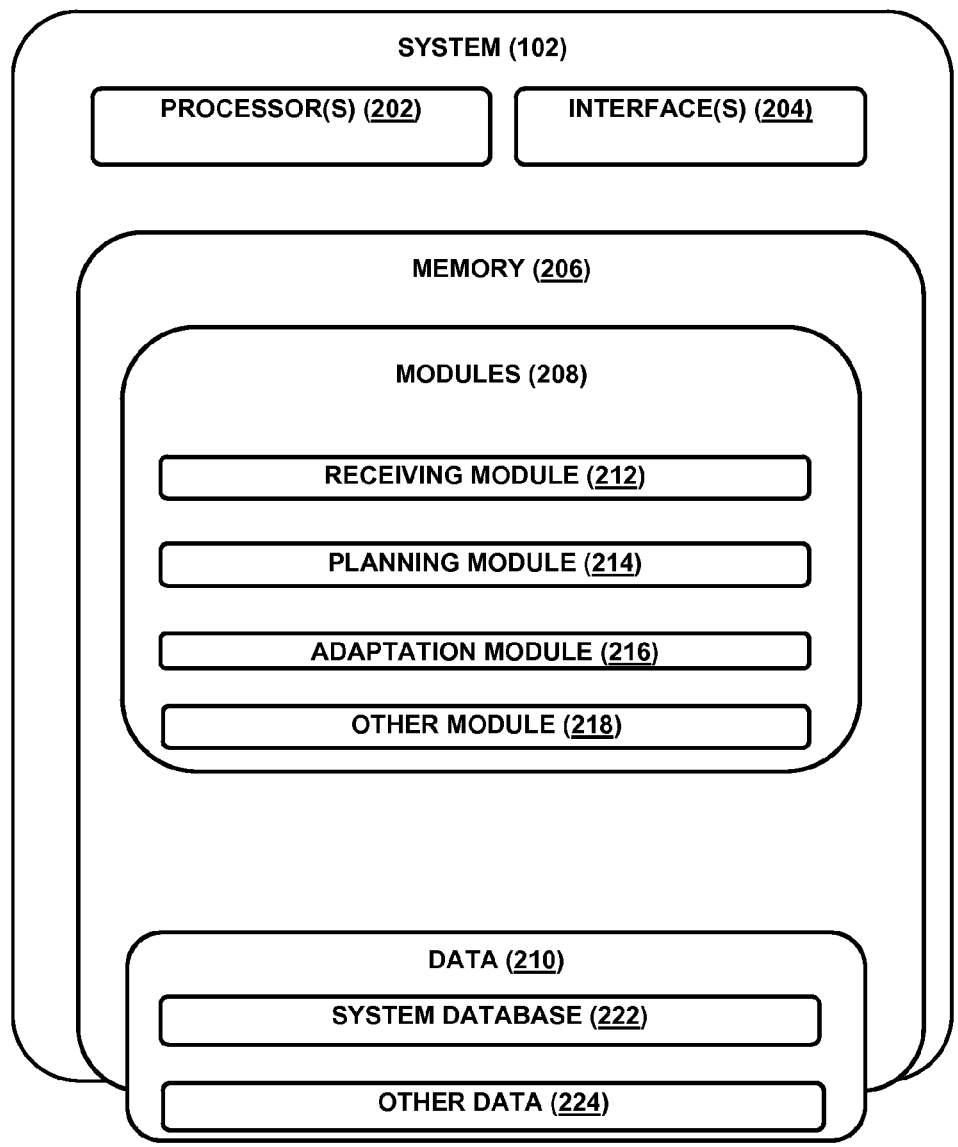
FIG. 2 illustrates the system for generating the plan to complete the task in the computing environment, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks, functions or implement particular abstract data types. In one implementation, the modules 208 may include a receiving module 212, a planning module 214, an adaptation module 216, and other modules 218. The other modules 218 may include programs or coded instructions that supplement applications and functions of the system 102. The programs include programmed instructions.

The data 210, amongst other things, serves as a repository for storing data processed, received, and generated by one or more of the modules 208. The data 210 may also include a system database 222, and other data 224. The other data 224 may include data generated as a result of the execution of one or more modules in the other module 218.

In one implementation, at first, a user may use the user device 104 to access the system 102 via the I/O interface 204. The user may register using the I/O interface 204 in order to access the system 102. The working of the system 102 may be explained in detail by referring to details of FIGS. 2 and 3. The system 102 may be used to generate a plan. The system 102 may be used to generate the plan to complete a task in a computing environment. In order to complete the task, the system 102, at first, receives data. Specifically, in the present implementation, the system receives data through the receiving module 212.

Figure 3:
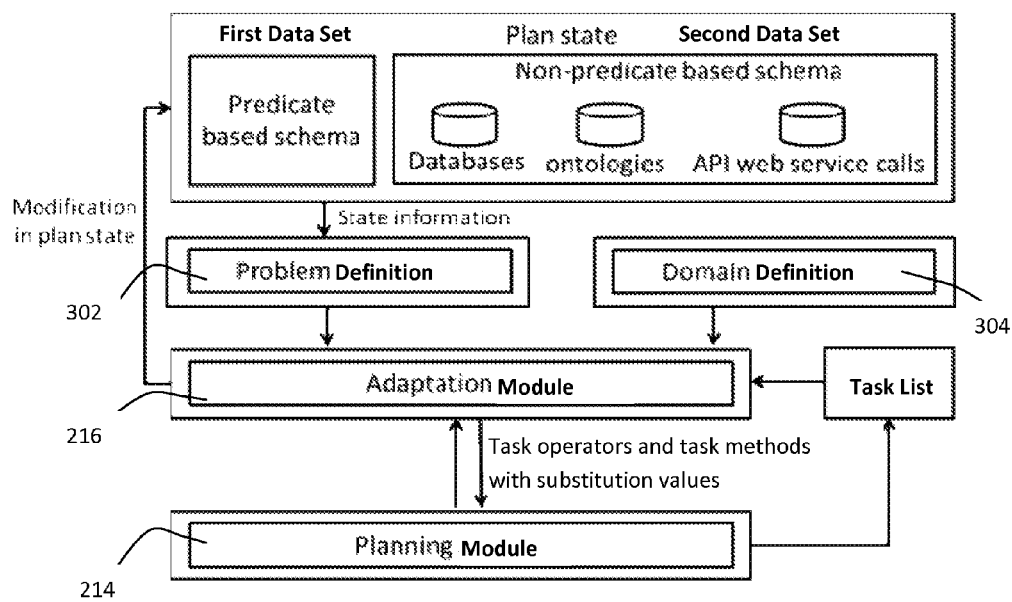
FIG. 3 illustrates a framework of the system for generating the plan to complete the task in the computing environment, in accordance with an embodiment of the present subject matter.

Referring to FIGS. 2 and 3, detailed working of the system 102 is illustrated, in accordance with an embodiment of the present subject matter. Referring to FIG. 3, the detailed working of the receiving module 212 along with working of other components of the system 102 are illustrated, in accordance with an embodiment of the present subject matter. The receiving module 212 may receive a problem definition. The problem definition may comprise a first dataset and a second dataset. The first dataset and the second dataset may be associated with a task. By way of an example the task may be booking a ticket, moving packages between locations by trucks under certain spatial constraints and delivering deadlines, finding a sequence of biochemical (pathways) reactions in an organism producing certain substances, traveling and buying goods at selected markets minimizing costs, and the like. The first dataset may be generated and the second dataset may be received from one or more data sources. The first dataset may comprise one or more logical atoms. The second dataset may comprise one or more database atoms. The one or more logical atoms may be represented in a first schema. The one or more database atoms may be represented in a second schema. The first schema may be a predicate-based schema. The one or more logical atoms may be represented using predicate representation. The second schema may be a non-predicate-based schema. The one or more database atoms may represent the path to selectively access the one or more data sources. The one or more data sources may comprise databases, ontologies, application program interface calls, web services, or a combination thereof.

The one or more data sources may be heterogeneous data sources. The one or more heterogeneous data sources may comprise databases, ontologies, application program interface calls, and web services.

In the field of artificial intelligence, planning is a process of selecting and organizing actions by considering expected outcomes or goals. In a planning process, a plan state denotes a state of a world. The plan state is represented as a combination of a set of logical atoms and a set of database atoms that may change during the planning process. During the planning process, the state of the plan system, i.e., the plan state, may undergo change as determined by post conditions of the actions included in the plan. The plan state S may be represented by Equation (1)

$$S \to (la)'  \hspace{4cm} \text{Equation (1)}$$

In Equation (1), 'la' represents a logical atom. The logical atom may be represented in predicate form. The logical atom comprises a logical atom head and a set of logical atom arguments. For example, a fact—"amount of available cash is 10,000"—may be represented in the plan state as the logical atom 'available cash' represented as (avail-cash 10000). Here, avail-cash is the logical atom head and 10000 is an argument of the logical atom. The prior art plan state representation suffers from shortcomings such as practicability, scalability, and modularity. Hence, the plan state representation has become a requirement towards improvement.

According to an embodiment of the present disclosure, a modification in a plan state is disclosed. The system comprises a framework to provide the plan state representation in a modified form. The modification in the plan state may comprise a representation of the plan state using a combination of the one or more logical atoms and the one or more database atoms. The plan state representation using a combination of the one or more logical atoms and the one or more database atoms provides a support for the use of heterogeneous data sources (for example, for booking a flight ticket, various data sources of agents, flights, and weather can be used).

According to an embodiment of the present disclosure, the plan state may comprise the first dataset and the second dataset. The first dataset may comprise the one or more logical atoms. The one or more logical atoms may be represented in predicate form. The one or more logical atoms may represent frequently-changeable data (dynamic data) using predicate-based schema. The predicate-based schema may indicate representation of the one or more logical atoms in predicate form. The predicate form is a symbolic formal system used to represent facts or information that is true. By way of the above explained example, a fact or information is "amount of available cash is 10,000." The predicate representation of the fact is (avail-cash 10000). By way of an example, the available cash of a person is represented using a logical atom in predicate form, as an application of different operators on the logical atom may frequently change the value of the logical atom. The logical atoms related to available cash, agent, flight, and hotel may be represented in the predicate form as shown below:
(avail-cash 10000)
(agent thomascook 500)
(agent reachfar 600)

(flight-info flight IC814 kolkata london 40000 9 22 13 1)
(flight-info flight KF334 kolkata london 30000 11 23 12 0)
(hotel-info princess-hotel london 4 3500)
(hotel-info travelodge london 3 3600)

The second dataset may comprise the one or more database atoms. The one or more database atoms may be represented in a non-predicate schema. The non-predicate schema may indicate representation of the one or more database atoms in non-predicate form. In one embodiment, non-predicate representation may be a representation other than predicate representation. An example of the non-predicate form of representation is natural language. By way of a non-limiting example, state facts may be represented as 'amount of available cash is 10,000, 6 is even number.' In one embodiment, less-frequently changing data or non-changing data (static data) may be stored in one or more database atoms in the non-predicate form. Thus, by way of storing the less frequently changing data or non-changing data (static data) in a second schema, i.e., non-predicate schema, the frequent access of the data and frequent modification can be avoided. By way of an example, an agent's information (travel agent name, address, contact number, charge, etc.), or flight information (flight name, flight number, source, destination, cost, number of hops, departure, arrival, duration, etc.), or the hotel information (hotel name, location, class, type, price, etc.) of a city is represented using a non-predicate data source such as database atoms as shown below.

(:import-db mysql agentDB jdbc:mysql://localhost:3306 user user123 agent)
(:import-db mysql flightDB jdbc:mysql://localhost:3306 user user123 flight)
(:import-db mysql hotelDB jdbc:mysql://localhost:3306 user user123 hotel)

The representation of the database atoms in the non-predicate-based schema and the selective access of the database atoms from the one or more heterogeneous data sources using the path makes the plan state scalable, practical, and modular, and wherein cache memory is used to store the database atoms so fetched.

The logical atoms indicating dynamically varying data continually resides in the memory during the generation of the plan, whereas the database atoms indicating the static data is selectively loaded in the memory only when required during the generation of the plan, thereby facilitating optimal utilization of the memory and reducing data retrieval overhead during the generation of the plan. A connection may be added to the second dataset to access optimal data associated with the database atoms selectively. The optimal data associated with the database atoms may be required during planning. The optimal data associated with the database atoms may be accessed by using the path as represented in the database atoms.

Referring to FIGS. 2 and 3, the receiving module 212 may receive a task list in the problem definition. The task list may define tasks. The receiving module 212 may receive a domain definition. The domain definition may comprise a set of task methods and a set of task operators. The set of task methods may be of non-primitive type and the set of task operators may be of primitive type. The primitive type of task operator may indicate atomic work which can be directly accomplished by operator. E.g. "!set-agent" denotes a task operator of primitive type. The non-primitive type of task method may indicate a work or an action that may not be accomplished directly and may need to be decomposed into sub-tasks. E.g. "Book-Ticket" denotes task method of the non-primitive type.

Logical representation of the task method may comprise the task method precondition and the one or more sub-tasks. The task method precondition may comprise a logical precondition and/or a database precondition. The logical representation of the task operator may comprise the task operator precondition and an effect list. The task operator precondition may comprise the logical precondition and/or the database precondition. The effect list may comprise instructions for deletion or addition of the one or more logical atoms or deletion or addition of the one or more database atoms. The task method may be decomposed into sub-tasks if the precondition mentioned in the task method is satisfied by the plan state, that is, the first dataset and/or the second dataset.

The task method may comprise a first precondition and one or more sub-tasks. The first precondition may be at least one of a logical precondition and a database precondition. The task operator may comprise a second precondition and an action list. The second precondition may be at least one of the logical precondition and the database precondition. The action list may comprise instructions for deletion or addition of one or more logical atoms or deletion or addition of one or more database atoms.

The task method may be decomposed into the one or more sub-tasks. The task method may indicate an action to be accomplished by executing the one or more sub-tasks. The sub-task may be a task method or a task operator. The task operator may indicate an atomic action to be accomplished directly without any further decomposition.

The task method may be executed by decomposing the task method into the one or more sub-tasks. One or more variables of the first set of variables of the task method may be assigned to one or more sub-task arguments associated with the one or more sub-tasks. The one or more sub-tasks may be added to the task in order to iteratively execute the one or more sub-tasks. The task operator may be executed by selecting and modifying at least one of the one or more logical atoms and the one or more database atoms. At least one of a logical atom and a database atom may be added to the logical atoms and the database atoms respectively, based on the execution of the task operator. The execution of the sub-task may comprise validating at least one of the first precondition and the second precondition, assigning at least one of the first set of variables and the second set of variables, and either decomposing the task method, assigning at least one of the first set of variables and the second set of variables, and adding one or more sub-tasks to the task, or modifying one or more logical atoms, or one or more database atoms.

In the following example of a task method, the task "Book-Ticket" is first unified with a task method head. The task is decomposed into a sub-task "agent" if the precondition "(choose ?p)" is satisfied by plan state.

(:method(BookTicket ?x ?y ?z ?m ?p) //task method head and arguments
((choose ?p))                        //task method precondition
((agent ?x ?y ?z ?m)))               //decomposed task The task operator may complete the work/action/task if the pre-condition mentioned in the operator is satisfied by the plan state. As an effect of applying the task operator, some of the logical atoms may be deleted from the first dataset or the second dataset (if permitted), and some of the logical atoms may be added into the first dataset or the second dataset (if permitted). For example, the task operator may complete an action/primitive task "set-agent" if the precondition "(avail-cash ?x)" is satisfied by the current plan state, i.e. the first dataset and second dataset. As an effect, the logical atom "(avail-cash ?x)" is deleted and two logical atoms such as booking details, i.e."(booked-through ?a)" and updated available cash after booking, i.e. "(avail-cash (call-?x ?b))" are added to the first dataset. Following are the examples of representation and working of the task operator.

```
(operator (!set-agent ?a ?b) //task operator head and argument
((avail-cash ?x)) //task operator precondition
((avail-cash ?x)) //task operator delete list
((booked-through ?a)(avail-cash (call - ?x ?b)))) //task operator add list
```

Referring to FIGS. 2 and 3, the receiving module 212 may receive a problem definition. The problem definition may comprise one or more logical atoms, one or more database atoms, and the task list. The one or more database atoms may be represented with a path to selectively access the one or more database atoms from the one or more data sources. The one or more logical atoms and the one or more database atoms may be required to complete the task.

The problem definition may be a file containing description of the information to be used to complete the task. The information required to complete the task may comprise one or more logical atoms, one or more database atoms and the task list. In other words, the problem definition may be the plan state in which the task may be completed. By way of an example, the task is to book a ticket and the primary information/data required to complete the task of booking the ticket. The primary information comprises three logical atoms such as available cash information and information about two agents. The task is to book a ticket from Kolkata to London and using cash up to 30000, using a flight via an agent. By way of an example, the problem definition for the task to book a ticket is represented as follows.

```
(defproblem problem CITY
----------------------Initial plan state-----------------------
(
    (avail-cash 100000)
        (agent thomascook 500)
        (agent reachfar 600)
)
--------------Task list for a task of 'Bookticket'--------------------
((BookTicket kolkata london 30000 flight agent)))
```

Referring to FIGS. 2 and 3, the receiving module 212 may receive a domain definition. The domain definition may comprise a representation of the set of task methods, a representation of the set of task operators. The set of task methods and the set of task operators may be provided in the domain definition and may be required to complete the task. The domain definition may comprise actions, namely, the set of task methods, and the set of task operators used to complete the task mentioned in the task list. The domain definition may be provided by a domain descriptor, and the problem definition may be provided by the user.

Still referring to FIGS. 2 and 3, the planning module 214 may select a task method from the set of task methods or a task operator from the set of task operators. According to an embodiment of the present invention, the task method or the task operator may be selected by using the problem definition and the domain definition and by matching the task with the set of task methods and the set of task operators. The matching of the task with the set of task methods and the set of task operators may comprise the matching of a task head with the task method head or matching of the task head with the task operator head. The task method head may be mentioned in the representation of the task method, and the task operator head is mentioned in the representation of the task operator. The task head may be compared with the task method head of each task method from the set of task methods. The task head may be compared with the task operator head of each task operator from the set of task operators. The matching of the task with the set of task methods and the set of task operators is called a unification of the task method or the task operator. The unification of the task method or the unification of the task operator may be done by matching the task name (known as task-head) with the task method name (known as method-head) or the task operator name (known as operator-head). The task can be unified with more than one task method or more than one task operator at a time. But, only one task method or one task operator is selected by the planning module to complete the task.

Figure 5:
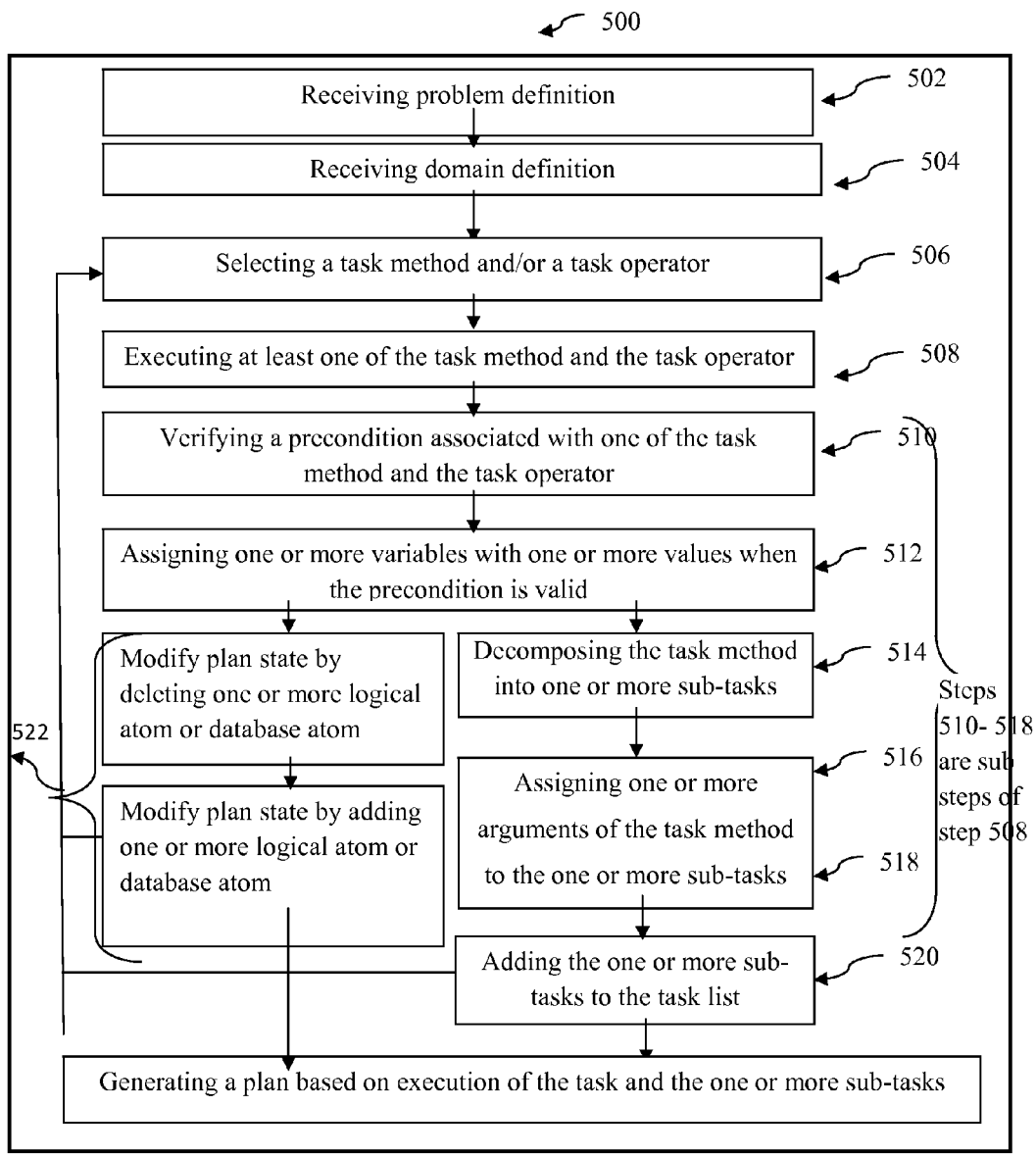
FIG. 5 illustrates a method for generating a plan to complete a task in a computing environment, in accordance with an embodiment of the present subject matter.

Referring to FIGS. 2 and 5, the adaptation module 216 and planning module 214 may be configured to execute at least one of the task method and the task operator in order to complete the task. The execution of the task method or the execution of the task operator may comprise verifying whether a precondition associated with one of the task method and the task operator is valid. The precondition may be a logical expression of one or more variables. The precondition may be verified by comparing the one or more variables with the one or more logical atoms or the one or more database atoms in order to match the one or more variables with the one or more logical atoms or the one or more database atoms. The comparing or matching of the one or more database atoms may be facilitated using the path mentioned in representation of the one or more database atoms. The precondition associated with the task method may be a method precondition defined in the task method and the precondition associated with the task operator may be an operator precondition defined in the task operator. In the following example, a precondition (method precondition) of the task method "BookTicket" is (choose ?p). The task "BookTicket" may be decomposed into a sub-task "agent" if the precondition "(choose ?p)" is satisfied by the plan state.

```
(:method(BookTicket ?x ?y ?z ?m ?p) //task method head and arguments
((choose ?p))                //precondition
((agent ?x ?y ?z ?m)))       //decomposed task
```

In the following example, a task operator "set-agent" can be applied to complete a task "set-agent" if the precondition "(avail-cash ?x)" is satisfied by the current plan state, i.e., the first dataset and the second dataset. As an effect, the logical atom "(avail-cash ?x)" is deleted and two logical atoms, such as booking details, i.e., "(booked-through ?a)," and updated available cash after booking, i.e., "(avail-cash (call-?x ?b))," are added to the first dataset. Following are the examples of representation and working of the task operator.

```
(:operator (!set-agent ?a ?b)
((avail-cash ?x))
((avail-cash ?x))
((booked-through ?a)(avail-cash (call - ?x ?b))))
```

According to an embodiment of the present disclosure, a precondition associated with the task method and/or a precondition associated with the task operator may be NULL. NULL implies no precondition. In one embodiment, the 'addlist', the 'deletelist' part of the task operator may also be NULL.

According to an embodiment of the present subject matter, modification in the precondition is provided. The precondition may be represented as a logical expression of predicate-based logical atoms as well as non-predicate-based database atoms. Modification in the task operator's effect may be obtained which refer to the modifications in the predicate-based logical atoms as well as modifications in the non-predicate-based database atoms based on the requirement. The database atoms may be stored in the one or more data sources. Further, the system and method of the present disclosure handles overhead caused by the database atoms by use of the adaptation module 216, without modifying the planning process. The overhead caused by the non-predicate-based database atoms may be the establishment of a connection to the one or more data sources to access the database atoms, to fetch the database atoms, to verify the precondition associated with the database atoms, and the like.

The adaptation module 216 may add a connection to the second dataset to access a database atom and fetch the database atom by using the path as represented in the database atom. The one or more logical atoms and the one or more database atoms may be supplied to the adaptation module 216. In accordance with an exemplary embodiment, the adaptation module 216 may be plugged in with other planners, like a classical planner, to avail the advantages mentioned in the present disclosure. The adaptation module 216 can also be reused for data gathering purposes. In the proposed framework, the problem definition and the domain definition may be two inputs to the adaptation module 216.

The adaptation module 216 may assign the one or more variables with one or more values when the precondition is valid. The one or more values may be obtained from the at least one logical atom and/or the at least one database atom so matched with the one or more variables.

The adaptation module 216 may execute the task operator. The execution of the task operator may comprise verifying the precondition associated with the task operator, and if the precondition is satisfied, may further comprise modifying the one or more logical atoms from the first dataset and/or modifying the one or more database atoms from the second dataset.

According to an embodiment of the present subject matter, when the task operator is selected and the precondition associated with the task operator is valid, the adaptation module 216 may modify the logical atom, and/or the database atom, as mentioned, into the task operators' effect part. The modification of the at least one logical atom and the at least one database atom may be based on the execution of the task operator.

The adaptation module 216 may add new one or more logical atoms to the first dataset and may add new one or more database atoms to the second dataset based on the execution of the task operator. The new one or more logical atoms are not present in the first dataset initially, and the new one or more database atoms are not present in the second dataset initially. According to an embodiment of the present subject matter, cache memory may be used to store the one or more database atoms fetched. The adaptation module 216 may fetch the one or more database atoms from the data sources to verify the precondition associated with the one or more database atoms. The one or more database atoms so fetched may be needed in the near future to verify another precondition. To reduce overhead from the need to fetch the same one or more database atoms again, the so fetched one or more database atoms are kept into the cache memory. Therefore, while verifying another precondition, if the adaptation layer gets a non-predicate precondition, the adaptation module first checks the one or more database atoms in the cache memory. Further, if the one or more database atoms are not matched with a database atom mentioned in the precondition, then the adaptation module 216 may check the data source using the path mentioned in the database atom.

When the task method is selected, the planning module may decompose the task method into one or more sub-tasks. The planning module may assign one or more values of arguments/variables of the task method to one or more sub-tasks' arguments. The planning module may add the one or more sub-tasks to the task list in order to execute the one or more sub-tasks. The adaptation module and planning module may execute the one or more sub-tasks. The one or more sub-tasks may be executed by iteratively selecting the sub-task from the task list.

The tasks and the sub-tasks may be selected based on priority, as mentioned in the task list. Further, the execution of sub-task may comprise selection of a task method from the set of task methods or a task operator from the set of task operators by using the problem definition and the domain definition, and by matching the sub-task head with each task method's head from the set of task methods, and by matching the sub-task head with each task operator's head from the set of task operators. The execution of the sub-task may further comprise executing at least one of the task method and/or the task operator so selected in order to complete the sub-task. The sub-task may be executed using similar steps as mentioned in the execution of the task.

The execution of the at least one of the task method and the task operator comprises verifying whether a precondition associated with one of the task method and the task operator is valid. The precondition is a logical expression of one or more variables. The precondition is verified by comparing the one or more variables with the one or more logical atoms or the one or more database atoms in order to match the one or more variables with at least one logical atom or at least one database atom. The comparing of the one or more database atoms is facilitated using the path provided in the database atom representation.

According to an embodiment of the present subject matter, the adaptation module 216 may facilitate the optimized use of the data and the optimized use of the memory in the planning process. In the present disclosure, the adaptation module 216 may verify the precondition with the first dataset and the second dataset. The precondition may be associated with the task method or the task operator. The precondition may comprise logical atoms and/or database atoms. By way of an example, if the precondition associated with the task method is "(:sort-by ?q<(mysql agentDB jdbc:mysql://localhost:3306 agent ?p/aname ?q/charge))", then the adaptation module 216 may connect to the database "agent," sort the entries from the database agent based on "charge," and return a tuple with the least value of charge associated with the agent. In the prior art techniques, the agent information represented as (agent thomascook 500) and (agent reachfar 600) would need to be loaded into the main memory of the planning system, since agent thomascook and agent reachfar are declared using a predicate-based schema.

The execution of the at least one of the task method and the task operator may comprise assigning the one or more variables with one or more values when the precondition is valid. The one or more values may be obtained from the one or more logical atoms or the one or more database atoms so matched with the one or more variables. Hence, execution of the one or more sub-tasks comprises iteratively performing the selecting of the task method and/or the task operator, and the executing of the task method and/or the task operator for each sub-task from the task list. The above-said steps are performed iteratively for each sub-task from the task list by selecting and executing each sub-task from the task list until there is no sub-task remaining in the task list. The execution of the sub-task comprises the verifying the precondition, the assigning of the one or more variables, the decomposing of the task method, the assigning of one or more arguments/variables, and the adding of the one or more sub-tasks to the task list. The sub-task is executed as an execution of the task.

Referring to FIG. 2 and FIG. 3, the planning module 214 may generate the plan based upon the execution of at least one of the tasks and the one or more sub-tasks. The plan may be generated by using the problem definition 302 and the domain definition 304. In the given example, completing the task "Bookticket" is to execute "agent," "set-agent," "book-via-agent," "book-transport-flight, the "book-ticket" methods and operators.

Figure 4:
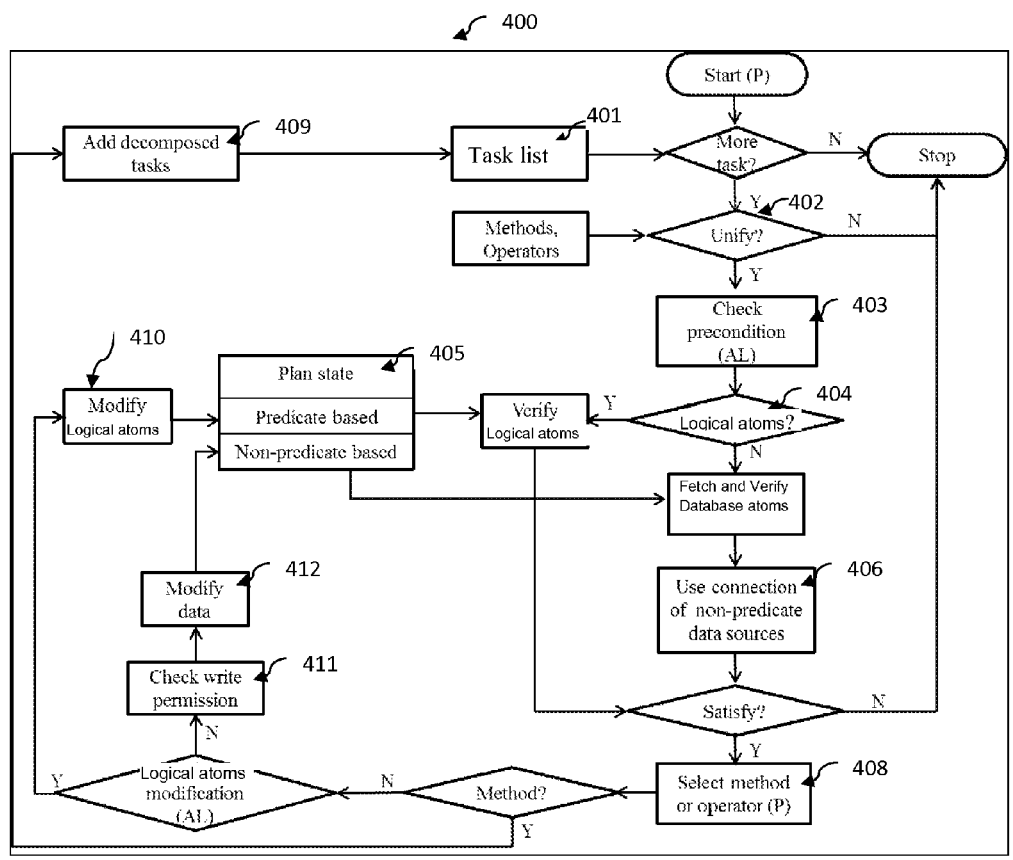
FIG. 4 illustrates a process flow chart for generating the plan to complete the task in the computing environment, in accordance with an embodiment of the present subject matter.

Referring to FIG. 4, the workings of the system 102, in accordance with an embodiment of the present disclosure, is explained. In step 401, a task list is received by the receiving module 212. Further, in order to accomplish the task from the task list, in step 402, the planning module 214 unifies the chosen task with a task method or a task operator, matching a task head with the task methods' head (for a non-primitive task), or matching a task head with the task operators' head (for a primitive task), based on the source of the task methods and task operators stored in the system database. The planning module selects the unified task method(s) or unified task operator(s) and may pass the unified task method(s) or unified task operator(s) to the adaptation module 216. In step 403, the adaptation module 216 then verifies the precondition of the task method(s) and task operator(s), with respect to the current plan state. The plan state comprises a first dataset comprising a plurality of logical atoms and a second dataset comprising plurality of database atoms. The pluralities of logical atoms are represented in a predicate-based schema, and the plurality of database atoms are represented in a non-predicate-based schema. A precondition is a logical expression of variables indicative of logical atoms and database atoms. In step 404, the variables (constituents) of the precondition (logical expression) are verified as to whether the variables (constituents) are logical atoms (predicates) or database atoms (non-predicates). So, satisfaction of the precondition depends on the matching of the logical atoms and database atoms from the plan state with the variables (constituents) of the logical expression. The matching of the logical atoms and database atoms from the plan state with the variables of the precondition (logical expression) is carried out in steps 405 and 406 respectively. If there are no such logical atoms or database atoms present in the plan state, the truth value of the precondition becomes false, not true. When the truth value of the precondition becomes false, the system 102 exits and stops.

Further, in step 405, the adaptation module verifies the availability for the set of logical atoms in the plan state. In step 406, for verifying the database atoms, adaptation module fetches the specified data and checks whether the data present in the data source can satisfy the precondition or not. The satisfaction of the verification associated with the logical atoms indicates presence of the logical atoms in the first dataset. Satisfaction of the verification associated with the database atoms indicates the presence of the database atoms in the second dataset. For a successful verification, the adaptation module 216 substitutes variables mentioned in the precondition with the grounded value. The grounded values are the values obtained from the one or more logical atoms or the one or more database atoms that satisfies the precondition.

The adaptation module 216 further assigns the grounded value to the uninstantiated argument list of the task method or the task operator. By way of an example, in precondition (choose ?p), 'p' is an 'uninstantiated' variable which is instantiated by value 'agent.' Next, in the case of the task method, in step 408, the planning module selects an applicable task method or task operator, and in step 409, the planning module decomposes the task methods into sub-tasks and the planning module adds the decomposed task of the task method to the task list. For the task operator in step 408, the adaptation module executes the task operator's effect part. The task operator's effect part contains "deletelist" and "addlist." If the "deletelist"/"addlist" refers to a modification in the one or more predicates (logical atoms), then, in step 410, the adaptation module 216, modifies the predicate(s) accordingly. Otherwise, in step 411, the adaptation module 216 checks for the permission of modification for non-predicate data from the data sources (in the case of dynamic data maintained in non-predicate-based data sources). If the modification of the non-predicate data is permitted and required, then in step 412, the adaptation module connects to the data sources and modifies (that is, adds or deletes or updates) the non-predicate data accordingly.

The method steps as described above are repeated until all the sub-tasks of the task list are completed. The process also exits if no step as above mentioned can accomplish any of the sub-tasks. FIG. 4 represents the process flowchart. Whenever the control passes from the planning module to the adaptation module or vice versa, the passing of control is mentioned within the bracket in the process flowchart.

According to an embodiment of the present subject matter, an implementation of the system 102 for generating the plan to complete the task in the computing environment is provided. Incorporation of the use of heterogeneous data sources in the planning system requires significant modifications in the grammar rule, as well as in the domain definition and the problem definition. The modifications in the grammar rule, the domain definition, and the problem definition are provided, by way of an example, considering that the database as the non-predicate information source is provided.

The modification in the grammar rule is explained. The keywords (e.g., and, call, imply, etc.) and the grammar terminals (e.g., :method, :sort-by, :first, etc.) used by the problem definition and the domain definition is mentioned in JSHOP2 grammar. A new grammar terminal, :import-db to differentiate database information from information represented by predicate-based schema in the plan state, is disclosed. Any logical expression that starts with:import-db refers to a database.

The modification in the problem definition is explained. The problem definition requires the following modifications. The modification in the plan state is explained in equation (2).

$$S \to (la|dba)^s \qquad \text{Equation (2)}$$

In equation (2), 'la' represents the logical atom and 'dba' represents the database atom. Each database belongs to a server. So, a server name, a database name, and a table name needs to be mentioned in the database atom. In order to establish a connection with database driver settings, a user name and password is also required. Hence, the driver settings, the user name, and the password are also mentioned in the database atom. Syntactically, the database atom is represented as shown below.

(:importdb servername dbname driversettings username password)

"Server name" implies the name of server, "db name" implies database name, and "driver settings," "user name," and "password" denote driver setting, username, and password, respectively. When the adaptation module gets a logical atom (predicate) while reading the problem definition, the adaptation module checks whether the logical atom is used (mentioned in) by the domain definition or not. If the logical atom is used (mentioned) in the domain definition, then the logical atom (predicate) is loaded in memory. If not, the logical atom is discarded. If the adaptation module finds a database atom having a reference to the database that is a path mentioned in the database atom to access the database, the adaptation module establishes a connection with the corresponding database with the help of the path provided in the database atom. The adaptation module adds the connection to the second dataset of the plan state. The connection is used in a later stage of the planning process such as for precondition checking, data modification, etc. The complete plan state comprising the first dataset and the second dataset is passed to the planning module at the initial stage of the planning process.

The modification in the domain definition is explained. The domain definition also requires some syntactic, operational modifications. The modification in precondition as mentioned in the domain definition is explained. The domain definition comprises the task methods and the task operators that may be used by the planning module and the adaptation module to complete the task. Both the task method and the task operator have a precondition part (P) represented as, $$P \rightarrow lp = le | \text{FIRST } le | \text{SORT VARID}(\mathit{fid})? le \quad \text{Equation (3)}$$

$$le \rightarrow (\text{AND})?(le)' | \text{OR}(le)^+ | \text{NOT } le | \text{IMPLY}$$
$$lele | la | \text{FORALL}(((\text{VARID})^*) | \mathit{NIL}) lele | \text{EXISTS}$$
$$((((\text{VARID})^*) | \mathit{NIL}) lele | \text{ASSIGN VARID}$$
$$\text{term} | \text{CALL fid:term1} | \mathit{NIL} \quad \text{Equation (4)}$$

The precondition mentioned above is associated with both (task method and task operator). Equation 3 and 4 represents the syntax of a precondition.

As shown above in Equation (3), said precondition lp represents the logical precondition which is actually a logical expression (le) or a first satisfier precondition or a sorted precondition. Precondition (FIRST le) compels the planning module (along with the adaptation module) to consider only the first set of bindings with respect to a plan state that satisfies le. The planning module (along with the adaptation module) may not consider the next bindings, even if the first bindings do not lead to a valid plan. SORT VARID (d)? le instructs the planning module to consider bindings in decreasing or increasing order using fid depending on the values of variable VARID. The logical expression may be a logical atom or any complex expression of conjunctions, disjunctions, negations, implications, universal quantifications, assignments, or call expressions. The modified logical expression of the precondition is provided as in Equation 5 below.

$$le(\text{AND})?(le)^* | \text{OR}(le)^+ | \text{NOT } le | \text{IMPLY}$$
$$lele | la | da | \text{FORALL}(\text{VARID})^*) lele | \text{EXISTS}$$
$$((\text{VARID})^*) \mathit{NIL}) lele | \text{ASSIGN VARID}$$
$$\text{term} | \text{CALL } \mathit{fid} \text{ term1} | \mathit{NIL} \quad \text{Equation (5)}$$

Here as provided in Equation (5), a database atom consists of a da head and an argument list. The database atom head contains the server name, database name, driver setting, and the table name. The argument list of the database atom refers to the uninstantiated variables. The uninstantiated argument list is instantiated with the values obtained from database tables. The uninstantiated variables mentioned in the precondition are instantiated by the values fetched from the database. If a data associated with the database atom needs to be fetched from the database table with a restriction (some specific value for a particular column), the column name needs to be mentioned within the third bracket of the database atom representation. Otherwise, if datum needs to be fetched without restriction, the column names of the table may or may not be mentioned. In this case, declaration of the column names is optional. The variables of database atom (da) are substituted after precondition checking Syntactically, the basic database precondition is represented as,
(servername_dbname_driversettings_tablename arg1[/col1] argm[/colm]).

When the adaptation module reads the basic database precondition, the adaptation module uses the already established connections and obtains data from the databases by executing a sql query mentioned below, by way of an example.
SELECT*FROM table name where colk=argk.

The plan state may contain more than one logical atom (predicate) that satisfies the precondition. The logical expression mentioned in the precondition can filter the logical atoms (predicates) that satisfy the precondition by applying restrictions such as call, sort-by, etc. For example, if the logical expression starts with sort-by, it sorts the logical atoms (predicates) on some arguments mentioned in the argument list and passes the top-most predicate to the adaptation module. In the case of a database precondition, the restrictions may be handled by formulating an equivalent sql query. An example of such a precondition and equivalent sql query is provided below. Sort-by database precondition:
(:sort-by ?col <(servername_dbname_driversettings_tablename arg1[/col1] ... argm[/colm])).
Equivalent sql query:
SELECT*FROM table name ORDER BY col ASC;

The modification in effect, other than the precondition part such as syntactic modification, is also required in the task operator's effect part—that is, an addlist and deletelist—is explained. The addlist and deletelist can change the database entry. The static data may be kept in the database table, and therefore no modifications are required (insert and delete). The addlist can refer to an update and the addition of a value to the database table, and the deletelist may refer to a deletion of data from the database table. Syntactically, the addlist and deletelist may be represented as similar database precondition expressions.
(servername_dbname_driversettings_tablename arg1[/col1] ... argm[/colm]).

Referring to the above said addlist and deletelist, the server name, the database (db) name, the driver settings, and the table name may follow similar notations as mentioned earlier. If the adaptation module 216 encounters a logical atom (predicate) in the addlist and deletelist, the adaptation module may add or delete the corresponding logical atom (predicate) in the first dataset. If the addlist and deletelist refers to a database record, the adaptation module may first check the write permission of the corresponding database. If permitted for the addlist, the adaption layer may execute a equivalent sql query, by way of an example, shown below,
INSERT INTO table name VALUES (arg1, ... , argm);
And for the deletelist the following query is executed.
DELETE FROM table name WHERE colk=argk;

According to an exemplary embodiment of the present disclosure, generation of the plan to complete the task in the computing environment is explained. By way of an example, the task is to book a ticket by selecting an agent and a flight. The domain definition consists of four task methods and two task operators. The functionality of each task method and each task operator is discussed below. The task method details are provided as herein.

Task Method—BookTicket: checks the option for booking ticket and chooses a booking according to the option. Task Method—agent: finds agents and their charges, and selects an agent with the least charge. Task Operator—set-agent: adds an agent name to the plan state, and modifies available cash after selecting the agent. Task Method—book-via-agent: selects flight as the transport mode. Task Method—book-transport-flight: checks flight options and selects a flight for a given source and destination whose fare is less than the available cash. Task Operator—book-ticket: adds the flight number to the plan state and modifies the cash available after booking the flight.

The domain definition is given below.

```
(defdomain CITY)
  (
     (:method(BookTicket ?x ?y ?z ?m ?p)
  ((choose ?p))
  ((agent ?x ?y ?z ?m)))
(:method (agent ?x ?y ?z ?m)
(:sort-by ?q <(mysql_agentDB_jdbc:mysql://localhost:3306_agent ?p/
aname ?q/charge))
((! set-agent ?p ?q)(book-via-agent ?x ?y ?z ?m)))
     (operator (! set-agent ?a ?b)
     ((avail-cash ?x))
((avail-cash ?x))
((booked-through ?a)(avail-cash (call - ?x ?b))))
     (:method(book-via-agent ?x ?y ?z ?m)
     ((transport-mode-mod ?m ?b ?c))
((book-transport-flight ?x ?y ?z)))
     (:method (book-transport-flight ?x ?y ?z)
     ((mysql_flightDB_jdbc:mysql://localhost:3306_flight ?a/mode ?b/fno ?x/
source
     ?y/destination ?e/fare ?f/start ?g/finish ?h/duration ?i/hops)(call <?e ?z))
        ((!book-ticket ?a ?b ?e)))
     (:operator (!book-ticket ?m ?c ?d)
     ((avail-cash ?x))
((avail-cash ?x))
     (( booked ?m ?c )(avail-cash (call - ?x ?d))))
     )
)
```

The problem definition comprises three predicates (logical atoms) and two database atoms (references to databases) and the task list. The predicates declare booking options, transport mode options, and available cash at the initial stage. By way of an example, MySQL is the database used herein. Among the two databases, the agent database contains the name of the agents (aname) and the charges (charge) associated with the agents for booking a ticket. The flight database contains flight information such as the flight mode, flight number, source, destination, fare, start time, finish time, duration of flight, and the number of hops.

The task list defines the task of booking a ticket. The problem definition is given below.

```
(defproblem problem CITY
---------------------State Facts (The logical atoms and the database
atoms) --------------
(
    (:import-db mysql agentDB jdbc:mysql://localhost:3306 user user123
    agent)
(:import-db mysql flightDB jdbc:mysql://localhost:3306 user user123 flight)
(transport-mode-mod flight train bus)
(avail-cash 100000)
(choose agent)
)
--------------Task list--------------------
(
(BookTicket kolkata london 30000 flight agent)
)
```

With the domain definition and the problem definition, the plan is generated by the planning module. Initially the task list comprises only one task: "BookTicket." The planning module unifies the task method "BookTicket" for the task "Book- Ticket." Unification of the task method for the task comprises matching a task head of the task with a task method head of the task method. The logical precondition—(choose ?p)—associated with the task method "BookTicket" is verified with respect to the given plan state information comprising the first dataset and the second dataset for (choose agent). So, the uninstantiated argument list comprising one or more variables of the precondition is substituted with a value (agent) from the first dataset. The task "BookTicket" is decomposed into the sub-task "agent." Values of the tasks' arguments (x, y, z, m) are assigned from the task method "BookTicket" argument list and from the precondition verification of the task method "BookTicket". The decomposed sub-tasks are added to the task list.

Further, the next sub-task is "agent" for which a task method "agent" is unified. Now, for the task method "agent," the precondition is a restricted database precondition and refers to a table, "agent." In the precondition, the restriction is given by sort-by. The restricted database precondition finds an agent name from the "agent" table whose charge is least. So, the adaptation module executes an equivalent SQL query provided below.

SELECT*FROM agent ORDER BY charge ASC;

The variables of the decomposed task, that is, the sub-task, are assigned in a similar way of method "BookTicket." The sub-tasks "set-agent" and "book-via-agent" are added to the task list.

The task "set-agent" is a primitive task. The planning module unifies the sub-task "set-agent" with the "set-agent" task operator. The precondition associated with the task operator "set-agent" is verified by the plan state predicates (avail-cash 100000). In effect, part of the "set-agent" is (deletelist), and the (deletelist) refers to a plan state predicate (logical atom) such as (avail-cash 100000) deletion. The addlist refers to an addition of the predicate 'avail-cash' with a modified argument value in the plan state. For example, if the agent selected is of cost 20000, the modified avail-cash value is 80000. Execution of the task operator constitutes unifying a task head with an operator head, verifying a precondition, and adding and/or deleting facts from the plan state.

For the next sub-task, "book-via-agent," the "book-via-agent" task method is unified by the planning module. A precondition associated with the "book-via-agent" task method is verified by the logical atoms (plan state predicates), such as (transport-mode-mod flight train bus), and the decomposed sub-task "book-transport-flight" is added to the task list. Next, the "book-transport-flight" sub-task is unified with a task method, "book-transport-flight." The task method has a database precondition restricted by "call." The database precondition selects an entry from the "flight" table of the database "flightDB" for source 'x,' destination 'y' and fare less than 'z.' For the database precondition following the SQL query is executed.

SELECT*FROM flight where source=x and destination=y and fare <z;

The argument list of the decomposed non-primitive sub-task "book-ticket" is assigned, and the sub-task is added to the task list. The planning module unifies the "book-ticket" task operator for the "book-ticket" task. The precondition (avail-cash ?x) associated with the "book-ticket" task operator is verified with respect to the first dataset (predicate plan state). The effect part of the "book-ticket" task operator modifies the avail-cash after booking the flight ticket and adds a new predicate (logical atom) stating the mode and booked flight number to the first dataset. The system 102 terminates after the above step, as no more sub-tasks exist in the task list.

Referring now to FIG. 5, a method 500 for generating a plan to complete a task in a computing environment is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described system 102.

Referring to FIG. 5, according to an embodiment of the present invention, a method (500) for generating a plan to complete a task in a computing environment is described.

In step 502, the method comprises receiving a problem definition. The problem definition comprises a first dataset and a second dataset. The first dataset and the second dataset are associated with the task. The first dataset comprises one or more logical atoms, and the second dataset comprises one or more database atoms, wherein the one or more logical atoms are represented in a first schema, and wherein the one or more database atoms are represented in a second schema. The one or more database atoms are represented with a path to selectively access the one or more database atoms from the one or more data sources. The one or more logical atoms and the one or more database atoms are required to complete the task. The problem definition further comprises a task list, wherein the task list defines the task. The one or more data sources may be heterogeneous data sources. The one or more heterogeneous data sources comprise databases, ontologies, application program interface calls, and web services.

The representation of the database atoms in the non-predicate-based schema and the selective access of the database atoms from the one or more heterogeneous data sources using the path makes the plan state scalable, practical and modular. Cache memory may be used to store the database atoms so fetched. The logical atoms may indicate dynamically varying data and the logical atoms may continually reside in the memory during the generation of the plan, whereas the database atoms may indicate the static data and may be selectively loaded in the memory only when required during the generation of the plan, thereby facilitating optimal utilization of the memory and reducing data retrieval overhead during the generation of the plan. A connection may be added to the second dataset to access optimal data associated with the database atoms selectively, required during planning, by using the path as represented in the database atoms.

In step 504, the method comprises receiving a domain definition. The domain definition comprises a set of task methods, a set of task operators, wherein the set of task methods are of non-primitive type and the set of task operators are of primitive type, In step 506, the method comprises selecting a task method from the set of task methods or a task operator from the set of task operators by matching the task with the set of task methods and the set of task operators. In one implementation, the planning module 214 selects the task method from the set of task methods or the task operator from the set of task operators by matching the task with the set of task methods and the set of task operators. More particularly, the planning module 214 selects the task method from the set of task methods or the task operator from the set of task operators by matching the task head with each task method's head from the set of task methods and by matching the task head with each task operator's head from the set of task operators.

The task method may comprise a first precondition and one or more sub-tasks, wherein the first precondition may be at least one of a logical precondition and a database precondition. The task operator may comprise a second precondition and an action list. The second precondition may be at least one of the logical precondition and the database precondition. The action list may comprise instructions for a deletion or addition of one or more logical atoms or a deletion or addition of one or more database atoms.

In step 508, the method comprises executing at least one of the task method and the task operator in order to complete the task. In one implementation, the adaptation module and the planning module execute the task method or the task operator. The execution of the task method or the execution of the task operator comprises following steps (steps 510-522).

In step 510, the execution of the task method or the execution of the task operator comprises verifying whether or not a precondition associated with one of the task method and the task operator is valid. The precondition is a logical expression of one or more variables. The precondition is verified by comparing the one or more variables with the one or more logical atoms or the one or more database atoms in order to match the one or more variables with at least one logical atom or at least one database atom. The comparing of the one or more database atoms is facilitated using the path mentioned in the representation of the one or more database atoms.

In step 512, the execution of the task method or the execution of the task operator further comprises assigning the one or more variables with one or more values, when the precondition is valid. The one or more values are obtained from the at least one logical atom or the at least one database atom so matched with the one or more variables.

In step 514, the execution of the task method further comprises decomposing the task method into one or more sub-tasks when the task method is selected and the task method precondition is satisfied.

The task method may be decomposed into the one or more sub-tasks, and wherein the task method may indicate an action to be accomplished by executing the one or more sub-tasks. The sub-task may be a task method or a task operator. The task operator may indicate an atomic action to be accomplished directly without any further decomposition. The method further comprises adding at least one of a logical atom and a database atom to the logical atoms and the database atoms respectively, based on the execution of the task operator.

In step 516, the execution of the task method further comprises assigning one or more arguments of the task method to the one or more sub-tasks. The task method may be executed by decomposing the task method into the one or more sub-tasks, assigning one or more variables of the first set of variables of the task method to one or more sub-task arguments associated with the one or more sub-tasks, and adding the one or more sub-tasks to the task in order to iteratively execute the one or more sub-tasks. The task operator may be executed by selecting and modifying at least one of one or more logical atoms and one or more database atoms.

In step 518, the execution of the task method further comprises adding the one or more sub-tasks to the task list in order to execute the one or more sub-tasks.

In one implementation, the adaptation module 216 carries out verifying a precondition associated with one of the task method and the task operator (step 510) and assigning the one or more variables with one or more values (step 512). The planning module 214 carries out decomposing the task method into one or more sub-tasks (step 514), assigning one or more arguments of the task method to the one or more sub-tasks (step 516), and adding the one or more sub-tasks to the task list (step 520).

The method 500 further comprises in step 520 executing the one or more sub-tasks by iteratively performing the selecting and the executing of each sub-task from the task list. In one implementation, the adaptation module 216 and the planning module 214 executes the one or more sub-tasks. The execution of the sub-task may comprise validating at least one of the first precondition and the second precondition, assigning at least one of the first set of variables and the second set of variables, and either decomposing the task method, assigning at least one of the first set of variables and the second set of variables, adding one or more sub-tasks to the task, or modifying one or more logical atoms, or one or more database atoms.

In step 522, the execution of the task operator comprises verifying the precondition associated with the task operator and if the precondition is satisfied, modifying the logical atom in the first dataset and/or modifying the database atom in the second dataset.

Referring to step 502 of the method 500, the first schema is a predicate-based schema, wherein the one or more logical atoms are represented using predicate logic, and the second schema is a non-predicate-based schema, wherein the database atoms are represented comprising the path to access the one or more data sources.

Referring to step 506 of the method 500, when the task operator is selected and the precondition is valid, the method 500 further comprises modifying the one or more logical atoms and the one or more database atoms, and the modification of the one or more logical atoms and the one or more database atoms is based on the execution of the task operator. In one implementation, the adaptation module 216 modifies the one or more logical atoms and the one or more database atoms.

The method 500 further comprises adding a connection to the second dataset to access data associated with the one or more database atoms by using the path as represented in the one or more database atoms. The method 500 further comprises using the connection from the second dataset to fetch the data associated with the one or more database atoms by using the path as represented in the one or more database atoms. The method 500 further comprises adding new one or more logical atoms to the first dataset and adding new one or more database atoms to the second dataset based on the execution of one of the task operator, wherein the new one or more logical atoms are not present in the first dataset initially and the new one or more database atoms are not present in the second dataset initially. The method 500 further comprises using cache memory to store the data associated with the one or more database atoms fetched.

The method 500 comprises generating the plan based upon the execution of the task and each sub-task from the task list. In one implementation, the planning module 214 generates the plan based upon the execution of the task and each sub-task from the task list. The steps of the method (500), such as, the receiving, the selecting, the executing, the verifying, the assigning, the decomposing, the assigning, the adding, the executing, the modifying, the adding the connection, the using the connection, and the generating are performed by means of a processor.

Although implementations for methods and systems for generating a plan to complete a task in a computing environment have been described in language specific to structural features and/or methods, it is to be understood that the appended claims are not necessarily limited to the specific features or methods described. Rather, the specific features and methods are disclosed as examples of implementations for generating a plan to complete a task in a computing environment.

We claim:

1. A method for optimal representation of a plan state while generating a plan to complete a task in a computing environment, wherein the optimal representation of the plan state improves efficiency of the computing environment through improved utilization of memory and reduction of overhead from data retrieval, the method comprising:

providing a processor and a non-transitory memory coupled to said processor, wherein the non-transitory memory comprises programmed instructions;

representing a plan state including one or more tasks, via the processor and the non-transitory memory, the plan state comprising a first dataset and a second dataset, wherein the second dataset is received from one or more heterogeneous data sources, and wherein the first dataset comprises logical atoms represented in a predicate-based schema, and the second dataset comprises database atoms represented in a non-predicate-based schema, wherein the logical atoms indicate dynamically-varying data to be accessed frequently, and wherein the database atoms indicate static data, and wherein a database atom of the second dataset is represented with a path, wherein the path facilitates selective access of the database atoms from the one or more heterogeneous data sources;

iteratively selecting, via the processor, one or more task methods from a set of predefined task methods and one or more task operators from a set of predefined task operators, based on the one or more tasks to be completed, to define one or more selected task methods and one or more selected task operators;

successively executing, via the processor, the selected task methods and the selected task operators in order to complete the task, wherein the execution of each of the selected task methods and each of the selected task operators includes:

validating a first precondition associated with the selected task method and a second precondition associated with the selected task operator, by matching a first set of variables associated with the selected task method and a second set of variables associated with the selected task operator, with at least one of the logical atoms and the database atoms, and wherein matching of the database atoms is facilitated using the path, assigning:

if the first precondition is valid, the first set of variables with a first set of values, and if the second precondition is valid, the second set of variables with a second set of values, wherein the first set of values and the second set of values are obtained from one or more logical atoms of the first dataset and one or more database atoms of the second dataset, so matched with the first set of variables and the second set of variables respectively, executing:

the selected task method using the first set of values, and the selected task operator using the second set of values; and generating, via the processor, a plan based upon the execution of the selected task methods and the selected task operators;

wherein at least one of a logical atom and a database atom is added to the logical atoms and the database atoms respectively, based on the execution of the selected task operator.

2. The method of claim 1, wherein the database atoms accessed during the executing are stored in a cache memory, and wherein a representation of the database atoms in the non-predicate-based schema and the selective access of the database atoms from the one or more heterogeneous data sources using the path makes the plan state scalable, practical and modular.

3. The method of claim 1, wherein the logical atoms indicating the dynamically varying data continually resides in the memory during the generation of the plan, and wherein the database atoms indicating the static data are selectively loaded in the memory only when required during the generation of the plan, thereby facilitating optimal utilization of the memory and reducing data retrieval overhead during the generation of the plan.

4. The method of claim 1, wherein the one or more heterogeneous data sources comprise databases, ontologies, application program interface calls, and web services.

5. The method of claim 1, wherein the selected task method comprises the first precondition and one or more sub-tasks, wherein the first precondition is at least one of a logical precondition and a database precondition, and wherein the selected task operator comprises the second precondition and an action list, wherein the second precondition is at least one of the logical precondition and the database precondition, and wherein the action list comprises instructions for a deletion or an addition of one or more logical atoms or a deletion or an addition of one or more database atoms.

6. The method of claim 5, wherein the selected task method is decomposed into the one or more sub-tasks, and wherein the selected task method indicates an action to be accomplished by executing the one or more sub-tasks, and wherein the sub-task is a task method or a task operator, and wherein the task operator indicates atomic action to be accomplished directly without any further decomposition.

7. The method of claim 6, wherein the selected task method is executed by decomposing the selected task method into the one or more sub-tasks, assigning one or more variables of the first set of variables of the selected task method to one or more sub-task arguments associated with the one or more sub-tasks, and adding the one or more sub-tasks to the task in order to iteratively execute the one or more sub-tasks.

8. The method of claim 5, wherein the selected task operator is executed by selecting and modifying at least one of one or more logical atoms and one or more database atoms.

9. The method of claim 1, wherein a connection is added to the second dataset to selectively access optimal data associated with the database atoms that is required during planning, by using the path as represented in the database atoms.

10. The method of claim 6, wherein the execution of the sub-task comprises validating at least one of the first precondition and the second precondition, assigning at least one of the first set of variables and the second set of variables, and either decomposing the selected task method, assigning at least one of the first set of variables and the second set of variables, adding one or more sub-tasks to the task, or modifying one or more logical atoms or one or more database atoms.

11. A system for optimal representation of a plan state while generating a plan to complete a task in a computing environment, wherein the optimal representation of the plan state improves efficiency of the computing environment through improved utilization of memory and reduction of overhead from data retrieval, the system comprising:

a processor;

a memory coupled to the processor, wherein the processor is capable of executing programmed instructions stored in the memory for:

representing a plan state including one or more tasks, via the processor, the plan state comprising a first dataset and a second dataset associated with the one or more tasks, wherein the second dataset is received from one or more heterogeneous data sources, and wherein the first dataset comprises logical atoms represented in a predicate-based schema, and the second dataset comprises database atoms represented in a non-predicate-based schema, wherein the logical atoms indicate dynamically-varying data to be accessed frequently, and wherein the database atoms indicate static data, and wherein a database atom of the second dataset is represented with a path, wherein the path facilitates selective access of the database atoms from the one or more heterogeneous data sources;

iteratively selecting, via the processor, one or more task methods from a set of predefined task methods and one or more task operators from a set of predefined task operators, by matching the task method and the task operator with a task to be completed to define one or more selected task methods and one or more selected task operators;

successively executing, via the processor, the selected task methods and the selected task operators, in order to complete the task, wherein the execution of each of the selected task methods and each of the selected task operators includes:

validating a first precondition associated with the selected task method and a second precondition associated with the selected task operator, by matching a first set of variables associated with the selected task method and a second set of variables associated with the selected task operator, with at least one of the logical atoms and the database atoms, and wherein matching of the database atoms is facilitated using the path, assigning:

if the first precondition is valid, the first set of variables with a first set of values, and if the second precondition is valid, the second set of variables with a second set of values, wherein the first set of values and the second set of values are obtained from one or more logical atoms of the first dataset and one or more database atoms of the second dataset, so matched with the first set of variables and the second set of variables respectively, executing:

the selected task method using the first set of values and the selected task operator using the second set of values; and generating, via the processor, a plan based upon the execution of the selected task methods and the selected task operators;

wherein at least one of a logical atom and a database atom is added to the logical atoms and the database atoms respectively, based on the execution of the selected task operator.

12. The system of claim 11, wherein the database atoms accessed during the executing are stored in a cache memory, and wherein a representation of the database atoms in the non-predicate-based schema and the selective access of the database atoms from the one or more heterogeneous data sources using the path makes the plan state scalable, practical and modular.

13. The system of claim 11, wherein the logical atoms indicating the dynamically varying data continually resides in the memory during the generation of the plan, and wherein the database atoms indicating the static data are selectively loaded in the memory only when required during the generation of the plan, thereby facilitating optimal utilization of the memory and reducing data retrieval overhead during the generation of the plan.

14. The system of claim 11, wherein the selected task method is decomposed into one or more sub-tasks, and wherein the selected task method indicates an action to be accomplished by executing the one or more sub-tasks, and wherein the sub-task is a task method or a task operator, and wherein the task operator indicates an atomic action to be accomplished directly without any further decomposition.

15. A non-transitory computer readable medium embodying a program executable in a computing device for optimal representation of a plan state while generating a plan to complete a task in a computing environment, wherein the optimal representation of the plan state improves efficiency of the computing environment through improved utilization of memory and reduction of overhead from data retrieval, the program comprising:

a program code for representing a plan state including one or more tasks, the plan state comprising a first dataset and a second dataset, associated with a task, wherein the second dataset is received from one or more heterogeneous data sources, and wherein the first dataset comprises logical atoms represented in a predicate-based schema, and the second dataset comprises database atoms represented in a non-predicate-based schema, wherein the logical atoms indicate dynamically varying data to be accessed frequently, and wherein the database atoms indicate static data, and wherein a database atom of the second database is represented with a path, wherein the path facilitates selective access of the database atoms from the one or more heterogeneous data sources;

a program code for iteratively selecting one or more task methods from a set of predefined task methods and one or more task operators from a set of predefined task operators, by matching the task method and the task operator with the task to be completed, to define one or more selected task methods and one or more selected task operators;

a program code for successively executing the selected task methods and the selected task operators in order to complete the task, wherein the execution of each of the selected task methods and each of the selected task operators of the task operators includes:

validating a first precondition associated with the selected task method and a second precondition associated with the selected task operator, by matching a first set of variables associated with the selected task method and a second set of variables associated with the task operator, with at least one of the logical atoms and the database atoms, and wherein matching of the database atoms is facilitated using the path, assigning:

if the first precondition is valid, the first set of variables with a first set of values, and if the second precondition is valid, the second set of variables with a second set of values, wherein the first set of values and the second set of values are obtained from one or more logical atoms of the first dataset and one or more database atoms of the second dataset, so matched with the first set of variables and the second set of variables respectively, executing:

the selected task method using the first set of values and the selected task operator using the second set of values; and a program code for generating the plan based upon the execution of the selected task methods and the selected task operators;

wherein at least one of a logical atom and a database atom is added to the logical atoms and the database atoms respectively, based on the execution of the selected task operator.

* * * * *